United States Patent [19]

Kritzberg et al.

[11] 3,779,557

[45] Dec. 18, 1973

[54] PSYCHOLOGICAL TESTING AND THERAPEUTIC BOARD GAME APPARATUS

[75] Inventors: Nathan I. Kritzberg; Richard Gardner, both of Tenafly, N.J.

[73] Assignee: Psychotherapeutic Devices, Inc., New York, N.Y.

[22] Filed: July 30, 1971

[21] Appl. No.: 167,372

[52] U.S. Cl. .............................. 273/135 D, 35/22 R
[51] Int. Cl. .............................. A63f 3/00
[58] Field of Search.......................... 273/135; 35/22

[56] References Cited
UNITED STATES PATENTS

| | | | |
|---|---|---|---|
| 760,384 | 5/1904 | Dieterich | 273/135 D UX |
| 2,959,871 | 11/1960 | Honkavaara | 35/22 R |
| 3,191,938 | 6/1965 | Smith | 273/135 D |
| 3,396,972 | 8/1968 | Smith | 273/135 D |

FOREIGN PATENTS OR APPLICATIONS

| | | | |
|---|---|---|---|
| 925,831 | 3/1947 | France | 273/135 D |

Primary Examiner—Delbert B. Lowe
Attorney—James E. Ryder et al.

[57] ABSTRACT

A game includes a stimulus board having a number of emotionally significant words arranged thereon. Lettered playing pieces are employed to permit players to complete words on the board and thus receive an intermediate reward. The word completed is used as a jumping off point for storytelling, answering questions about the story told and dramatizing the story told. All of these additional steps in the game provide additional intermediate rewards. White squares and white playing pieces permit undirected storytelling. Gold playing pieces and gold squares require the selection of one of a series of cards that provide a very directed type of storytelling. Intermediate rewards during the game and more concrete rewards at the end of the game enhance the game feature and provide an incentive for storytelling and fantisizing.

11 Claims, 4 Drawing Figures

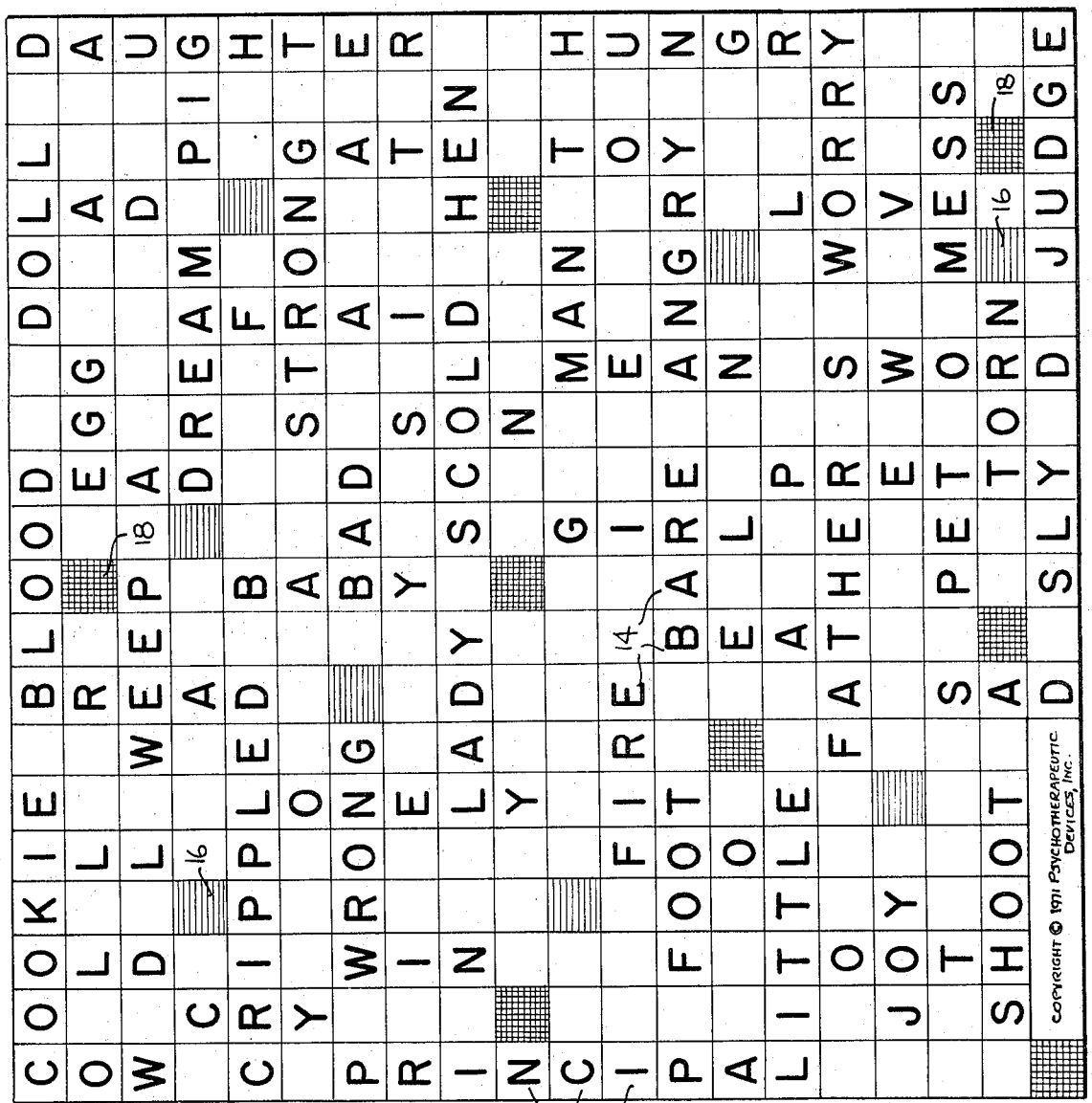
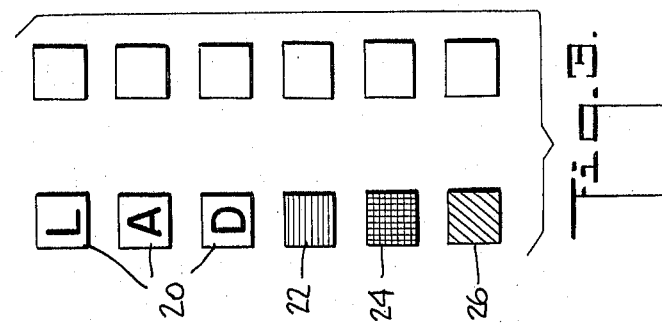
Fig. 1.
Fig. 3.

PSYCHOLOGICAL TESTING AND THERAPEUTIC BOARD GAME APPARATUS

This invention in general relates to psychological therapy, and more particularly to a game type of device particularly adapted to be employed with children in evoking meaningful and effective storytelling.

BACKGROUND OF THE INVENTION

In the process of psychological therapy, and in particular with children, it is known to employ a free play situation in order to evoke fantasy which may be a partial basis for analysis and therapy. The fantasizing that results from known techniques tends to be narrow in range and difficult to use in therapy. The major purpose of this invention is to provide a more fruitful fantasy evocation.

It is a further purpose of this invention to provide a context, within which the fantasy evocation occurs, that is amenable to further processing by the therapist. In particular, it is a purpose of this invention to permit the therapist to make inquiry, concerning the fantasy evoked, in a fashion that has a minimum likelihood of freezing the fantasy evocation. It is desired that the therapist inquiry be viewed as part of the fantasy evocation process rather than as a third degree.

It is a further purpose of this invention to provide a specific repeatable, though broad, context within which the fantasy evocation arises so that patterns of fantasy evocation can be observed and some relationship can be drawn to model responses.

It is another purpose of this invention to provide a technique to achieve relevant fantasy evocation in a manner that is an efficient use of the therapist's time.

BRIEF DESCRIPTION OF THE INVENTION

In brief, this invention is in a game, played by patient and therapist, that includes the telling of a story based on word stimuli. A stimulus board is employed that is divided into square spaces and has a number of words arranged thereon in something like crossword puzzle fashion. The words are selected for their emotional significance and for the fact that they are likely to incite relevant emotional feelings. In addition to square spaces on the stimulus board having letters, the board includes white spaces and gold spaces. The playing pieces are small squares which fit within the spaces of the board. The face of each playing piece carries one of four types of markings: a letter; a white surface; a gold surface; or a checker-ed green and yellow surface.

Six lettered playing pieces are distributed, face-up, to each player at the start of the game. The rest of the playing pieces are deployed face-down in a bank. Players take turns placing the playing pieces, two at a time, on corresponding spaces on the board. Each time two playing pieces are placed on the board, two replacement pieces are drawn blindly from the bank and placed face-up in front of the player making the draw.

When a player places a playing piece that completes a word, he receives an intermediate reward in the form of a star-shaped gold chip. He is then asked to tell a story either using the word, or about the word. If he does so, he receives two gold star chips. When the player selects a white faced playing piece, he places it on a white space on the board and receives a double reward (four chips) on telling any story that comes to his mind. When a player selects a gold faced playing piece, he then selects the top one of a number of face-down surprise cards. The face of the surprise card provides any one of a large number of possibilities. Some of the surprise cards award gold star chips, other surprise cards require storytelling based on a phrase or a stated event and provide gold star chips as rewards for telling the story involved. The green and yellow faced pieces can be used to represent any letter.

Enhanced results and greater depth of analysis can be obtained by awarding additional gold star chips for answering certain questions about the story told. Still further results can be obtained by providing further chip awards for dramatizing part or all of the story told.

At the end of a playing session, the player with the most chips receives a prize and is deemed the winner or the chips are turned in at a certain trade-in rate for trinkets.

BRIEF DESCRIPTION OF THE DRAWINGS

Other objects and purposes of this invention will be apparent from the following detailed description and drawings in which:

FIG. 1 is a representation of a first game board employed in a first embodiment of this invention;

FIG. 3 is a representation of various playing pieces employed in connection with the FIG. 1 and FIG. 2 embodiments.

DESCRIPTION OF THE PREFERRED EMBODIMENT

Figures 2, 4:
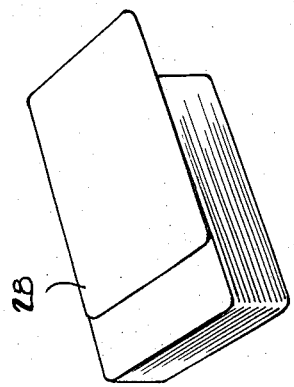
FIG. 2 is a representation of a second game board employed in connection with a second embodiment of this invention.
FIG. 4 is a representation of the deck of cards that may be employed in connection with the FIG. 1 and FIG. 2 embodiments.

The Figures illustrate typical and presently preferred boards. FIGS. 1 and 2 represent two boards 10, 12 that can conveniently be two sides of a single board. Two boards are desirable to introduce a degree of variety into the game when it is played repeatedly with the same patient. The boards of FIG. 1 and of FIG. 2 provide essentially the same function. Each board illustrated includes a range of emotionally loaded words. The words illustrated in FIGS. 1 and 2 are preferred because they have been carefully selected for their emotional content.

This invention appears to be most apt for the testing and the therapy of children who can read at a relatively simple level and who feel comfortable with written words. The age range of applicability is approximately from seven to thirteen.

The structure of the game board is important and the way in which the game employing the board is played is also important.

The Structure of the Board

The board, typical embodiments 10, 12 of which are shown in FIGS. 1 and 2, has the appearance of a filled in crossword puzzle. It will be referred to herein as a stimulus board in that the words appearing on the board tend to stimulate significant emotional feelings and responses. All but one or two words on the board are carefully selected to be emotionally loaded. The words illustrated tend to evoke elements of significant primary emotions as well as elements of commonplace complexes.

The set of 58 words illustrated in FIG. 1, and the set of 57 words illustrated in FIG. 2 are substantially equivalent sets of words. Each set samples the same clusters of primary ideas, primary emotions and commonplace complexes. They are largely interchangeable as provocation stimuli. The purpose of this redundancy, or equivalency, is to offer some variety and novelty in order to minimize the tediousness due to repetition of the same verbal stimuli. The following 16 clusters of words are illustrated in FIGS. 1 and 2:

1. Orality; that is, dependent orientation. This category is represented by the words- candy, cookie, milk, bread, nurse, cow, poor, hungry, tooth, yell, scold, nag, steal, pig, hen.
2. Anality; that is, anal retentive or explosive orientation. This category is repre-sented by the words- dirty, mess, smell, pig, money.
3. Sado-masochistic orientation. This category is represented by the words- gun, shoot, knife, sword, cruel, mean, kill, blood, beat, hate, hurt, sick, ill, torn, punish, cripple.
4. Authoritarian orientation. This category is represented by the words- principal, teacher, witch, monster, cop, judge.
5. Super-ego conflict derivatives. This category is represented by the words- bad, love, ashamed, like, punish, sorry, wrong, worry, witch, shy.
6. Negative or positive identity (self-image) derivatives. This category is represented by the words- weak, strong, shy, friendly, scared, afraid, small, ugly, little, pretty, dumb, fool.
7. Derivatives of fear of and rejecting attitude toward masculine identity; for example, feminine identification in boys. This category is represented by the words- flower, doll.
8. Derivatives of fear of and rejecting attitude toward feminine identitu; identity; example, masculine identification in girls. This category is represented by the word- gate.
9. Derivatives of concern with death and/or aging. This category is represented by the words- die, dead, alone, lonely, weep, old.
10. Narcissistic; that is, exhibitionistic orientation. This category is represented by the words- bare, naked, pretty, ugly, shy, ashamed.
11. Derivatives of concern with reproduction and/or generativity. This category is represented by the words- egg, baby, mother, father, hen.
12. Representatives of affective states or emotional tone. This category is represented by the words - sad, weep, cry, happy, joy, angry, hate, love, like, mad, worry, sorry, lonely, afraid, scared, ashamed, shy.
13. Competitive orientation. This category is represented by the words- win, lose.
14. Derivatives of prejudice. This category is represented by the word- Jew.
15. Derivatives of anti-social or asocial behavior. This category is represented by the words- lie, steal, beat, kill, cruel, mean, fire.
16. Representatives of significant objects (persons, animate, inanimate, and part-objects). This category is represented by the words- man, lady, girl, boy, mother, father, dad, baby, daughter, lad, pet, dog, finger, foot, doll, toy, hen, cow, tooth.

There are three types of playing spaces on the board, the spaces 14 of a first set of playing spaces contain the letters of the words on the board. Only one letter appears in each of the spaces 14. Since the words are arranged in crossword puzzle fashion, certain of the spaces 14 contain a letter that is part of two words. In addition, eight white colored playing spaces 16 constitute a second set of playing spaces and eight gold colored playing spaces 18 constitute a third set. Other spaces on the board that are not playing spaces have a neutral background of a color that will permit the white spaces 16 and gold spaces 18 to stand out distinctly.

In addition to the board, there are a number of square playing pieces, some of which are shown in FIG. 3. A first set of playing pieces is composed of pieces 20 which have a letter on the face thereof. A second set of playing pieces is composed of eight pieces 22 hich are colored white on the face thereof. A third set of playing pieces is composed of eight pieces 24 which are colored gold on the face thereof. A fourth set of playing pieces is composed of twenty-five pieces 26 which are colored with yellow and green checkered squares on the face thereof. Each of these pieces 20, 22, 24, 26, when turned down, presents a back that is identical to every other piece so that the player is unable to determine what is contained the face of the playing pieces by viewing the back of these pieces. The dimensions of each of these playing pieces 20, 22, 24 and 26 are such that they will fit within the playing spaces 14, 16 and 18 on the boards 10, 12.

In addition, a set of cards 28 is employed. These cards are normally deployed face-down and may be termed "Surprise Cards". The face of the first card might carry the "Surprise Cards" legend. The face of each one of the rest of the cards 28 carries an instruction. A preferred set of fifth surprise cards will carry the following 49 instructions, a separate instruction on a separate card:

1. SORRY! YOU MUST RETURN FIVE (5) GOLD STAR CHIPS TO THE BANK. (OR AS MANY AS YOU HAVE, IF YOU HAVE LESS THAN FIVE (5).
2. GOOD LUCK! THE BANK MUST PAY YOU FIVE (5) GOLD STAR CHIPS!
3. GOOD LUCK! TAKE FIVE (5) GOLD STAR CHIPS FROM EACH OF THE OTHER PLAYERS. (OR AS MANY AS THEY HAVE, IF THEY HAVE LESS THAN FIVE CHIPS.)
4. BAD LUCK! GIVE FIVE (5) GOLD STAR CHIPS TO THE PLAYERS ON YOUR RIGHT! (OR AS MANY AS YOU HAVE, IF YOU HAVE LESS THAN FIVE CHIPS.)
5. GOOD LUCK! TAKE AN EXTRA TURN NOW!!
6. BAD LUCK!! YOU LOSE YOUR NEXT TURN!!
7. GOOD LUCK!! JACKPOT! YOU GET DOUBLE GOLD STAR CHIPS FOR YOUR NEXT STORY AND ITS QUESTIONS AND PLAY!
8. CONGRATULATIONS! YOU CAN TELL A STORY ABOUT ANY WORD ON THE BOARD WHICH YOU CHOOSE AND YOUR GET PROPER REWARDS!!
9. THE PERSON TO YOUR RIGHT MUST MAKE UP A STORY ABOUT ANY OF THE WORDS YOU HAVE ALREADY COMPLETED, BUT YOU GET HIS TWO GOLD STAR REWARD CHIPS!! (IF YOU HAVE NOT ALREADY COMPLETED A WORD, TAKE THE NEXT YELLOW CARD.)

10. YOU GET TWO CHIPS (GOLD STARS) IF YOU CAN MAKE UP A STORY STARTING WITH THE WORDS: A TERRIBLE THING ONCE HAPPENED ...

11. YOU GET TWO GOLD STAR CHIPS IF YOU CAN MAKE UP A STORY STARTING WITH THE WORDS: ONCE UPON A TIME THERE WAS A CHILD WHO HAD A PROBLEM ...

12. YOU GET TWO GOLD STAR CHIPS IF YOU CAN MAKE UP A STORY STARTING WITH THE WORDS: ONCE UPON A TIME THERE WAS A CHILD WHO WAS FRIGHTENED ...

13. YOU GET TWO GOLD STAR CHIPS IF YOU CAN MAKE UP A STORY STARTING WITH THE WORDS: IF I HAD MY WAY ...

14. YOU GET TWO CHIPS IF YOU CAN MAKE UP A STORY STARTING WITH THE WORDS: A CHILD FELL ASLEEP AND DREAMT ...

15. YOU GET TWO GOLD STAR CHIPS IF YOU CAN TELL A STORY ABOUT A BOY OR GIRL WHO FOUND A MAGIC LAMP OUT OF WHICH CAME A GENII, WHO SAID HE WOULD MAKE COME TRUE ANY THREE WISHES OF THE BOY OR GIRL.

16. YOU GET TWO GOLD STAR CHIPS IF YOU CAN MAKE UP A STORY STARTING WITH THE WORDS: ONCE UPON A TIME THERE WAS A CHILD WHO WAS HAPPY!!

17. YOU GET TWO GOLD STAR CHIPS IF YOU CAN MAKE UP A STORY STARTING WITH THE WORDS: ONCE UPON A TIME THERE WAS A BAD CHILD ...

18. YOU GET TWO GOLD STAR CHIPS IF YOU CAN MAKE UP A STORY STARTING WITH THE WORDS: ONCE UPON A TIME THERE WAS A CHILD WHO WAS SAD AND UNHAPPY!!

19. YOU GET TWO GOLD STAR CHIPS IF YOU CAN MAKE UP A STORY STARTING WITH THE WORDS: ONCE UPON A TIME THERE WAS A GOOD CHILD ...

20. YOU GET TWO GOLD STAR CHIPS IF YOU CAN MAKE UP A STORY STARTING WITH THE WORDS: ONCE UPON A TIME THERE WAS A CHILD WHO WAS ANGRY ...

21. YOU GET TWO GOLD STAR CHIPS IF YOU CAN MAKE UP A STORY STARTING WITH THE WORDS: ONCE UPON A TIME THERE WAS A CHILD WHO WAS WEAK ...

22. YOU GET TWO GOLD STAR CHIPS IF YOU CAN TELL A STORY STARTING WITH THE WORDS: ONCE UPON A TIME THERE WAS A CHILD WHO WAS STRONG ...

23. YOU GET TWO GOLD STAR CHIPS IF YOU CAN MAKE UP OR TELL A STORY STARTING WITH THE WORDS: ONCE UPON A TIME THERE WAS A CHILD WHO WAS DIRTY, A DIRTY CHILD ...

24. YOU GET TWO GOLD STAR CHIPS IF YOU CAN MAKE UP A STORY STARTING WITH THE WORDS: ONCE UPON A TIME THERE WAS A CHILD WHO WAS SMART, A SMART CHILD ...

25. YOU GET TWO GOLD STAR CHIPS IF YOU CAN MAKE UP A STORY STARTING WITH THE WORDS: ONCE UPON A TIME THERE WAS A CHILD WHO WAS DUMB, A DUMB CHILD ...

26. YOU GET TWO GOLD STAR CHIPS IF YOU CAN MAKE UP A STORY STARTING WITH THE WORDS: ONCE UPON A TIME THERE WAS A LAZY CHILD ...

27. YOU GET TWO GOLD STAR CHIPS IF YOU CAN MAKE UP A STORY STARTING WITH THE WORDS: ONCE UPON A TIME THERE WAS A CHILD WHO WAS LIVELY AND ACTIVE, A LIVELY AND ACTIVE CHILD ...

28. YOU GET TWO GOLD STAR CHIPS IF YOU CAN MAKE UP A STORY STARTING WITH THE WORDS: ONCE UPON A TIME THERE WAS A GREEDY CHILD, A CHILD WHO WAS GREEDY ...

29. YOU GET TWO GOLD STAR CHIPS IF YOU CAN MAKE UP A STORY STARTING WITH THE WORDS: ONCE UPON A TIME THERE WAS A GUILTY CHILD, A CHILD WHO FELT GUILTY ...

30. YOU GET TWO GOLD STAR CHIPS IF YOU CAN MAKE UP A STORY STARTING WITH THE WORDS: ONCE UPON A TIME A CHILD WAS CRYING ...

31. YOU GET TWO GOLD STAR CHIPS IF YOU CAN MAKE UP A STORY STARTING WITH THE WORDS: THIS IS THE STORY OF A CHILD WHO WAS RESCUED, WHO WAS SAVED ...

32. YOU GET TWO GOLD STAR CHIPS IF YOU CAN MAKE UP A STORY STARTING WITH THE WORDS: ONCE UPON A TIME THERE WAS A CHILD WHO DESERVED PUNISHMENT ...

33. YOU GET TWO GOLD STAR CHIPS IF YOU CAN MAKE UP A STORY BEGINNING WITH THE WORDS: ONCE UPON A TIME A CHILD WAS PUNISHED ...

34. YOU GET TWO GOLD STAR CHIPS IF YOU CAN TELL A STORY STARTING WITH THE WORDS: THERE ONCE WAS A CHILD WHO DID SOMETHING WRONG ...

35. YOU GET TWO GOLD STAR CHIPS IF YOU CAN MAKE UP A STORY STARTING WITH THE WORDS: ONCE UPON A TIME THERE WAS A CHILD WHO FELT ASHAMED ...

36. YOU GET TWO GOLD STAR CHIPS IF YOU CAN MAKE UP A STORY STARTING WITH THE WORDS: THERE ONCE WAS A CHILD WHO WAS HIDING ...

37. YOU GET TWO GOLD STAR CHIPS IF YOU CAN MAKE UP A STORY BEGINNING WITH THE WORDS: ONCE UPON A TIME THERE WAS A CHILD WHO HAD A SECRET ...

38. YOU GET TWO GOLD STAR CHIPS IF YOU CAN MAKE UP A STORY BEGINNING WITH THE WORDS: THERE ONCE WAS A JEALOUS CHILD, A CHILD WHO WAS JEALOUS ...

39. YOU GET TWO GOLD STAR CHIPS IF YOU CAN MAKE UP A STORY BEGINNING WITH THE WORDS: ONCE UPON A TIME THERE WAS A PROUD CHILD ...

40. YOU GET TWO GOLD STAR CHIPS IF YOU CAN MAKE UP A STORY BEGINNING WITH THE WORDS: ONCE UPON A TIME THERE

WAS A LONELY CHILD, A CHILD WHO WAS LONELY . . .
41. YOU GET TWO GOLD STAR CHIPS IF YOU CAN MAKE UP A STORY BEGINNING WITH THE WORDS: ONCE UPON A TIME THERE WAS A CHILD WHO WANTED TO HARM SOMEONE . . .
42. YOU GET TWO GOLD STAR CHIPS IF YOU CAN MAKE UP A STORY BEGINNING WITH THE WORDS: ONCE UPON A TIME THERE WAS A MEAN CHILD . . .
43. YOU GET TWO GOLD STAR CHIPS IF YOU CAN MAKE UP A STORY STARTING WITH THE WORDS: ONCE UPON A TIME THERE WAS A LOVED CHILD, A CHILD WHO WAS LOVED . . .
44. YOU GET TWO GOLD STAR CHIPS IF YOU CAN MAKE UP A STORY STARTING WITH THE WORDS: ONCE UPON A TIME THERE WAS A CHILD WHO WAS UNLOVED, AN UNLOVED CHILD . . .
45. YOU GET TWO GOLD STAR CHIPS IF YOU CAN MAKE UP A STORY USING ANY FOUR LETTER WORD ON THE BOARD.
46. YOU GET TWO GOLD STAR CHIPS IF YOU CAN MAKE UP A STORY USING ANY FIVE LETTER WORD ON THE BOARD . . .
47. YOU GET THREE GOLD STAR CHIPS IF YOU CAN MAKE UP A STORY USING ANY TWO WORDS ON THE BOARD.
48. YOU GET TWO GOLD STAR CHIPS IF YOU CAN MAKE UP A STORY ABOUT ANY OBJECT OR THING NAMED ON THE BOARD.
49. YOU MAY EXCHANGE ANY THREE OF YOUR LETTERS FOR THREE REPLACEMENT LETTERS.

Playing the Game

Under a preferred set of rules, the game is played with each participant receiving six lettered playing pieces 20 set face-up in front of him. Taking turns, each player places two of the six face-up playing pieces in front of him on corresponding board spaces. The rest of the playing pieces are facedown in a bank. After a player puts two pieces on the playing board, he blindly selects two playing pieces from the bank and puts them face-up in front of him. This arrangement of being able to place two pieces 20 at a time from a group of six face-up pieces serves to speed up word completion abd thus provide an efficient use of the therapist's time.

An intermediate goal in the game is to complete a word because in completion of a word an intermediate award of a star-shaped gold chip is received. The letters at the disposal of each player obviously aid in achieving this intermediate goal. The green and yellow checkered faced playing pieces 26 can be used as "jokers" to aid in the completion of any word. A relatively substantial number (25) of these joker playing pieces 26 are provided so that they will turn up with enough frequency to aid a patient in completing a word that he has a particular desire to complete. These pieces 26 help maintain a fast pace to the game and increase the frequency of word completion and thus of storytelling. This again means an efficient use of the therapist's time.

One advantage of this game arrangement is that the therapist has an important option. HE can distribute his playing pieces 20 as randomly as possible on corresponding letters on the board. Alternatively, he can place the letters he turns up on particular words to which he wishes to direct the patient's attention. As a further alternative, the therapist can place the letters that he picks up on words to which the patient has already apparently directed his own attention. In the latter approach, the therapist will be aiding the patient in completing words that appear to be significant to the patient. Since the player who receives the award is the player who places the letter that completes the word, the therapist can avoid completing a word that he is particularly concerned be completed by the patient. Of course, it is of some importance that the therapist complete words sufficiently often so that the game element remains. However, it is anticipated that the therapist will maximize his use of time by having the patient make most of the word com-pletions.

An advantage of the combination of placing lettered playing pieces 20 from a set of six face-up pieces and of using joker playing pieces 26 is that the patient is given a wide option for the selection of words on the board that have considerable interest or meaning to him.

As indicated above, as soon as a word is completed, the player who completes the word winds an award of, for example, a single gold star chip. In the rare case where the placing of a single letter completes two words, two chips are awarded.

The player who completes the word can then earn two additional chips for constructing or making up a story using the completed word or about the subject matter to which the completed word refers.

It is after the story has been completed that there are various possibilities open for further therapeutically processing the material. The game board and game sequence up to this point lend themselves to the various optional therapeutic maneuvers that are initially expressed to the patient as the rules of the game. Experience, judgment and preference will dictate which game plan will be followed.

One useful sequence, after the story has been completed, is to indicate that a fourth gold star chip can be obtained by answering a series of questions about the story. The particular questions asked by the therapist will of course be analytically oriented questions. These questions may ostensibly be directed to clarify the story but will, in addition, provide insight for at least the therapist and, perhaps, also for the patient.

A further rule of the game that is possible is to provide a fifth gold star chip for the player's dramatization of the story. This dramatization can be effected with the aid of the other players. These other players may be the therapist and/or other child players when the game is used in a group therapy situation.

Thus, as described above, it is possible to acquire five gold chips for spelling out a word, elaborating a story around the word, replying to questions about the story, and finally, play-acting a scene or scenes around the incidents in the story. The last two features of the game might be modified or eliminated depending upon the wishes of the therapist.

When a playing piece selected by the player is a white faced piece 22, the player on the next turn must place the piece face-up on one of the white spaces 16. The player then receives an intermediate award, for that placement, of two gold star chips. It is to be noted that the intermediate award for this white piece 22 play is preferably an award twice what it would have been upon word completion. This doubling of award applies at each step of the prescribed sequence. Thus, a player may be awarded four gold star chips for telling a story of any sort after picking up a white faced playing piece 22, and placing it on a white space 16. Replying to inquiry about the story told on this play is rewarded with two additional gold star chips and dramatization of the story is rewarded with two more star shaped chips. Thus, when a white playing piece 22 is selected, as many as ten chips might be obtained by the player. This doubling of the reward, when the white playing piece 22 is involved, aids in overcoming resistance to this open ended story telling situation. The magnitude of the reward minimizes the number of occasions where a patient claims that he cannot think of anything.

When a gold face playing piece 24 is selected, the player places that piece face-up on one of the gold colored spaces 18 on his next turn and receives one gold star for that placement. He then selects one of the surprise cards 28. The surprise card selected provides for one of the situations set forth above, resulting in the player winning gold star chips out of hand, losing chips out of hand, or in most cases, winning two gold star chips if the player tells a story starting with the phrase set forth on the surprise card selected. Again, further chips can be won by answering questions and by dramatizing the story told.

The player who accumulates the most chips during the playing session, usually something under an hour, may be adjudged the winner and given a pre-arranged award, such as a small toy or trinket. Alternately an incentive award system may be established in which a given number of gold stars are echanged for a trinket or small toy.

The use of specific concrete rewards, in the form of trinkets given to the child, has certain desirable results. First, the reward is sought by the child and increases the likelihood of the child's entering into the spirit of the game and thus, in effect, being cooperative with the process involved. Perhaps more importantly, the rewards underscore the game-like quality of the process. For the child to view the process as a game is an appreciable factor in gaining the child's active and meaningful participation in the process. In addition, the use of intermediate awards (the chips) as part of the inquiry process aids in establishing the inquiry process as part of the overall game process. This fosters acceptance of the inquiry and aids in minimizing the kind of uncooperative reaction that is likely to occur if the child sees the inquiry process as a third degree type inquiry.

The texts on the surprise cards 28 set forth above show that many of the cards make reference to the telling of a story incorporating a specific one of the emotionally loaded words. As an important variation on the set of surprise cards, it should be recognized that additional or substitute surprise cards can be employed which call for the player to tell a story using any one of a specified set of words set forth on the particular surprise card. In such an embodiment of the invention, the group of words set forth on these other surprise cards will normally all come from the same cluster of words. The significant clusters of words that would be involved are exemplified by the 16 clusters outlined in connection with the discussion above of the structure of the board.

It should be noted that the device of this invention is indeed a game device and will be seen as such by the patient. The combination of skill and chance features involved assure that it will be seen as a game device.

The particular set of letters arranged before each player, from which set the players place letters on the game board, are provided on a chance or random basis. There is, however, an element of skill in addition to the element of chance in that the player purposely selects from among the face-up set of letters in front of him in order to build up a word and maximize the chance of completing a word as quickly as possible.

A further element of chance is in the means by which a surprise card is selected. The surprise card, however, once selected constrains the player to tell a story either about the particular word set forth on the surprise card, or about one of the words from a small sub-set of the total number of words employed in this game.

Thus, it may be seen that although there is an element of chance in whether or not a surprise card is to be selected by a player at any time and a further element of chance as to which surprise card is selected, the surprise card itself provides much more limited player choice of words about which a story is to be told than does the placement on the board of particular letters from the group of face-up letters in front of the player.

Furthermore, the selection of a white playing piece provides a great deal of freedom of choice for the player as to the story that is to be told. But, whether or not a white playing piece is recieved by a player and when it is received is a matter of chance.

The game aspect is further enhanced by the fact that certain of the cards 28 do not call for storytelling and by the fact that on certain of the letter placements, a word is not completed and thus there is no storytelling. Accordingly, the storytelling itself and the opportunity for intermediate rewards for storytelling are barred during some of the turns.

By a combination of randomly invoking the various means (the means being the cards and playing pieces of various types) by which storytelling is arrived at, by providing different degrees of constraint as to player selection of the word on which storytelling is to focus and even by barring storytelling during certain turns the result is a device that is readily perceived as a game and not as a forced inquiry. Both skill and chance enter into the game and into the obtaining of rewards. The primary element of skill is in the ability to tell a story but there is also an element of skill in deploying letters to complete a word on the game board. This combination of skill and chance in varying degrees serves to enhance the game-like aspect of this invention.

What is claimed is:

1. A psychological testing and therapeutic game device adapted to be employed to invoke fantasizing for purposes that include psychological testing and therapy comprising:
  A. a stimulus board having a set of words arranged thereon, said board having a first set of spaces thereon, each one of said first set of spaces containing a letter from at least one of said words,
  B. the predominent portion of the words on said board each tending to evoke a significant primary emotion,
  C. said words comprising a plurality of sub-sets of words, each of the words in any one of said sub-sets tending to evoke the same primary emotion, D. a first set of playing pieces, each piece adapted to be placed in a face-up position and in an upside-down position, each of said pieces when in said face-up position showing a letter of the alphabet, each of said pieces when in said upside-down position obscuring said letter, E. the relationship between the letter spaces of said words on said stimulus board and said playing pieces being such that a playing piece may be set in said face-up fashion on a letter space of said board corresponding to the letter on said playing piece so as to obscure only the corresponding letter of said stimulus board, F. a set of cards, each of said cards containing at least one word tending to evoke a significant primary emotion, all of said evoking words on any one card being a member of only one of said sub-sets, and G. A second set of playing pieces, each piece adapted to be placed in a face-up position and in an upside-down position, each of said second set of pieces when in a face-up position showing an indicia other than a letter and which may be interpreted as directing the selection of a card from said set of cards.

2. The device of claim 1 wherein said words on said board comprise:
a first sub-set of words relating to orality feelings,
a second sub-set of words relating to anality feelings,
a third sub-set of words relating to sado-masochistic feelings,
a fourth sub-set of words relating to authoritarian feelings,
a fifth sub-set of words relating to super-ego conflict feelings,
a sixth sub-set of words relating to self-image feelings,
a seventh sub-set of words relating to feelings about aging and death,
an eighth sub-set of words relating to narcissistic-exhibitionistic feelings,
a ninth sub-set of words relating to feelings concerning reproduction,
a tenth sub-set of words relating to emotional states,
an eleventh sub-set of words relating to competitive feelings, and
a twelfth sub-set of words relating to social behavior feelings.

3. The device of claim 2 further comprising:
a thirteenth sub-set of words relating to significant objects to which significant emotions attach.

4. The device of claim 3 wherein said words are arranged on said stimulus board in crossword type fashion.

5. The device of claim 4 further comprising:
a third set of playing pieces, each piece adapted to be placed in a face-up position and in an upside-down position, each of said third set of playing pieces when in a face-up position showing an indicia differing from the indicia on said first and second sets of playing pieces and which may be interpreted as allowing use on any one of said letter spaces, each of said third set of pieces when in said upside-down position obscuring its indicia.

6. The device of claim 5 further comprising:
a fourth set of playing pieces adapted to be placed in a face-up position and in an upside-down position, each of said forth set of pieces when in a face-up position showing an indicia differing from the indicia on said first, second and third sets of playing pieces and which may be interpreted as directing that none of said letter spaces be covered and that none of said cards be selected.

7. The device of claim 2 further comprising:
a third set of playing pieces, each piece adapted to be placed in a face-up position and in an upside-down position, each of said third set of playing pieces when in a face-up position showing an indicia differing from the indicia on said first and second sets of playing pieces and which may be interpreted as allowing use on any one of said letter spaces, each of said third set of pieces when in said upside-down position obscuring its indicia.

8. The device of claim 7 further comprising:
a fourth set of playing pieces adapted to be placed in a face-up position and in an upside-down position, each of said fourth set of pieces when in a face-up position showing an indicia differing from the indicia on said first, second and third sets of playing pieces and which may be interpreted as directing that none of said letter spaces be covered and that none of said cards be selected.

9. The device of claim 1 wherein said words are arranged on said stimulus board in crossword type fashion.

10. The device of claim 1 further comprising:
a third set of playing pieces, each piece adapted to be placed in a face-up position and in an upside-down position, each of said third set of playing pieces when in a face-up position showing an indicia differing from the indicia on said first and second sets of playing pieces and which may be interpreted as allowing use on any one of said letter spaces, each of said third set of pieces when in said upside-down position ob-scuring its indicia.

11. The device of claim 10 further comprising:
a fourth set of playing pieces adapted to be placed in a face-up position and in an upside-down position, each of said fourth set of pieces when in a face-up position showing an indicia differing from the indicia on said first, second and third sets of playing pieces and which may be interpreted as directing that none of said letter spaces be covered and that none of said cards be selected.

* * * * *